United States Patent
Bisht et al.

(10) Patent No.: US 9,557,935 B2
(45) Date of Patent: Jan. 31, 2017

(54) COMPUTING SYSTEM INCLUDING STORAGE SYSTEM AND METHOD OF WRITING DATA THEREOF

(71) Applicant: Samsung Electronics Co., Ltd., Suwon-si, Gyeonggi-do (KR)

(72) Inventors: Pradeep Bisht, Mountain View, CA (US); Jiurong Cheng, Milpitas, CA (US); Jong-tae Park, Seoul (KR); Sung-chul Kim, Hwaseong-si (KR); Seung-yeun Jeong, Anseong-si (KR); Sang-jin Oh, Suwon-si (KR); Jung-ho Kim, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 96 days.

(21) Appl. No.: 14/336,966

(22) Filed: Jul. 21, 2014

(65) Prior Publication Data

US 2015/0095574 A1    Apr. 2, 2015

(51) Int. Cl.
*G06F 3/06* (2006.01)
*G06F 12/08* (2016.01)

(52) U.S. Cl.
CPC ........... *G06F 3/0659* (2013.01); *G06F 3/0604* (2013.01); *G06F 3/0673* (2013.01); *G06F 12/0804* (2013.01); *G06F 12/0866* (2013.01); *G06F 2003/0695* (2013.01)

(58) Field of Classification Search
CPC .............. G06F 12/0866; G06F 12/0815; G06F 12/0888; G06F 3/0659
See application file for complete search history.

(56) References Cited

U.S. PATENT DOCUMENTS

| | | | | |
|---|---|---|---|---|
| 6,170,042 B1* | 1/2001 | Gaertner | ............... | G06F 3/0613 710/39 |
| 6,195,727 B1* | 2/2001 | Islam | .................. | G06F 11/1076 711/114 |
| 6,385,676 B1* | 5/2002 | Adkisson | ............ | G06F 12/0815 710/100 |
| 6,434,648 B1* | 8/2002 | Assour | .................. | G06F 13/387 710/305 |
| 6,629,211 B2* | 9/2003 | McKnight | ........... | G06F 12/0804 711/113 |
| 2004/0117441 A1* | 6/2004 | Liu | ..................... | G06F 12/0888 709/203 |
| 2007/0043854 A1* | 2/2007 | Shum | ................... | H04L 12/2602 709/224 |
| 2009/0006606 A1* | 1/2009 | Lubbers | .............. | H04L 41/0893 709/224 |
| 2009/0006689 A1* | 1/2009 | Lubbers | .................. | G06F 3/061 710/112 |
| 2011/0302367 A1* | 12/2011 | Balkesen | ............. | G06F 12/0804 711/105 |
| 2015/0286438 A1* | 10/2015 | Simionescu | .......... | G06F 3/0685 711/103 |

* cited by examiner

*Primary Examiner* — Ryan Bertram
(74) *Attorney, Agent, or Firm* — Renaissance IP Law Group LLP

(57) ABSTRACT

Provided is a method of writing data of a storage system. The method includes causing a host to issue a first writing command; causing the host, when a queue depth of the first writing command is a first value, to store the first writing command in an entry which is assigned in advance and is included in a cache; causing the host to generate a writing completion signal for the first writing command; and causing the host to issue a second writing command.

20 Claims, 11 Drawing Sheets

COMPUTING SYSTEM INCLUDING STORAGE SYSTEM AND METHOD OF WRITING DATA THEREOF

CROSS-REFERENCE TO RELATED APPLICATIONS

This application claims the benefit of Korean Patent Application No. 10-2013-0116891, filed on Sep. 30, 2013, in the Korean Intellectual Property Office, the disclosure of which is incorporated herein in its entirety by reference.

BACKGROUND

The inventive concept relates to a computing system including a storage system and a method of writing data thereof, and more particularly, to a computing system capable of improving a writing speed and a method of writing data thereof.

Native command queuing (NCQ) is a technique that stores a request for inputting and outputting (I/O) in a queue and then rearranges and executes the request for I/O in order to improve performance of a serial advanced technology attachment (SATA) device in a specific situation.

However, if a case where a host computer has to receive a response immediately synchronous I/O, that is, a case where a queue depth is 1, frequently occurs, it may be difficult to utilize a NCQ technique.

Not only SATA NCQ but with any device which can process multiple commands in parallel. For example all modern SSDs have multiple channels and they can process multiple commands at the same time.

SUMMARY

The inventive concept provides a computing system that increases a writing speed using a storage system.

According to an aspect of the inventive concept, there is provided a method of writing data of a storage system by host, the method comprising: issuing a first writing command; storing the first writing command in an entry which is assigned in advance and is comprised in a cache when a queue depth of the first writing command is a first value; generating a writing completion signal in response to the first writing command; and issuing a second writing command.

When the number of writing commands stored in the cache is equal to or greater than a first reference value, the method may further include reordering the writing commands in accordance with address values corresponding to the writing commands.

The reordering of the writing commands may include rearranging the writing commands so that the order of the writing commands conforms to the order of the address values corresponding to the writing commands.

When the total share of the writing commands stored in the cache is equal to or greater than a second reference value, the method may further include starting to flush the writing commands from the cache to the storage system.

When the total share of the writing commands stored in the cache is equal to or less than a third reference value, the method may further include stopping the flushing.

The flushing may be performed in units of a fixed number of entries.

When the total size of pieces of target data of the second writing command is equal to or greater than a third reference value and target address values of the second writing command are sequential values, the method may further include flushing the second writing command from the host to the storage without transmitting the second writing command from the host to the cache.

When the first writing command is stored in the cache, the total share of writing commands stored in the cache is equal to or greater than a fourth reference value, and target address values of the second writing command are sequential values, the method may further include flushing the second writing command from the host to the storage.

When a target address of the second writing command conforms to a target address of a writing command which is stored in the cache in advance, the writing command stored in the cache in advance may not be flushed to the storage, and only the second writing command may be flushed to the storage.

According to another aspect of the inventive concept, there is provided a computing system comprising: a host; and a storage system. When a queue depth of a first writing command is 1, the host stores the first writing command in an entry which is assigned in advance and is comprised in a cache, generates a writing completion signal for the first writing command, and issues a second writing command.

When the number of writing commands stored in the cache is equal to or greater than a first reference value, the writing commands may be reordered in accordance with address values corresponding to the writing commands.

The writing commands may be rearranged so that the order of the writing commands conforms to the order of the address values corresponding to the writing commands.

When the total share of the writing commands stored in the cache is equal to or greater than a second reference value, the writing commands may start to be flushed from the cache to the storage system.

When the total size of pieces of target data of the second writing command is equal to or greater than a third reference value and target address values of the second writing command are sequential values, the second writing command may be flushed from the host to the storage without being transmitted from the host to the cache.

When the first writing command is stored in the cache, the total share of writing commands stored in the cache is equal to or greater than a fifth reference value, and target address values of the second writing command are sequential values, the second writing command is flushed from the host to the storage.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
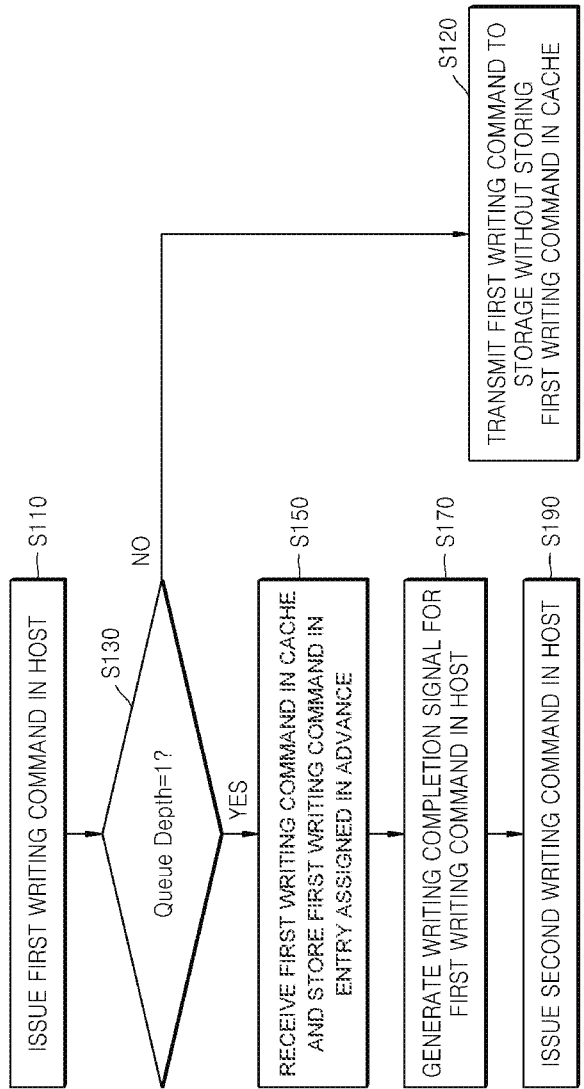
FIG. 1 is a flowchart illustrating a method of writing data of a storage system according to an embodiment of the inventive concept.

The inventive concept will now be described more fully with reference to the accompanying drawings, in which exemplary embodiments of the inventive concept are shown. The inventive concept may, however, be embodied in many different forms by one of ordinary skill in the art without departing from the technical teaching of the inventive concept. In other words, particular structural and functional description of the inventive concept are provided in descriptive sense only; various changes in form and details may be made therein and thus should not be construed as being limited to the embodiments set forth herein. As the inventive concept is not limited to the embodiments described in the present description, and thus it should not be understood that the inventive concept includes every kind of variation examples or alternative equivalents included in the spirit and scope of the inventive concept. Also, throughout the specification, like reference numerals in the drawings denote like elements. In the drawings, lengths and sizes of layers and regions may be exaggerated for clarity.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list.

FIG. 1 is a flowchart illustrating a method of writing data of a storage system according to an embodiment of the inventive concept.

Referring to FIG. 1, the method of writing data of a storage system according to the current embodiment includes causing a host to issue a first writing command (operation S110), causing the host to store the first writing command in an entry, which is assigned in advance and is included in a cache, when a queue depth if the first writing command is 1 (operation S130 and operation S150), causing the host to generate a first writing completion signal (operation S170), and causing the host to issue a second writing command (operation S190).

The host mentioned in this specification means a host computer (PC). In addition, the host means a device that performs a writing operation on a storage system, for example, an electronic device such as a multimedia device, a digital camera, a digital TV, a computer, a tablet, a phone or a server.

The queue depth mentioned in this specification means a physical limitation of a storage port capable of performing inputting and outputting (I/O) at a time. For example, when the queue depth is 1, an I/O command may be transmitted using one storage port. In addition, when the queue depth is 32, an I/O command may be transmitted using 32 storage ports. When the queue depth increases, the storage port may not be used in another application, and when the storage port decreases, the speed of the host computer felt by a user may be remarkably decreased.

In a general computing system, when a queue depth issued by an operating system is 1, a host waits to receive a response of a writing command from a storage. After the host receives the response, the host performs another writing command. On the other hand, when the queue depth is 32, the host transmits 32 writing commands to the storage, and receives responses of the commands from the storage, and then performs another writing command. Accordingly, when the queue depth is 1, the transmission speed of a writing command is lower than that in a case where the queue depth is 32.

In this specification, a cache may mean a memory which is included in the host computer and is capable of a high-speed operation faster than the main storage to which I/O is directed. For example, the cache may mean a volatile memory (DRAM, SRAM) which is included in the host computer.

In the method of writing data of the storage system, when the queue depth is 1, writing commands are stored in a portion of the cache which is assigned in advance, and the writing completion signal is generated in the host itself. Accordingly, the host may perform processing in the same manner that the writing commands were transmitted to the storage system to issue the writing commands later more rapidly. Thus, a user may feel an operation of the host computer more rapidly.

Figure 2:
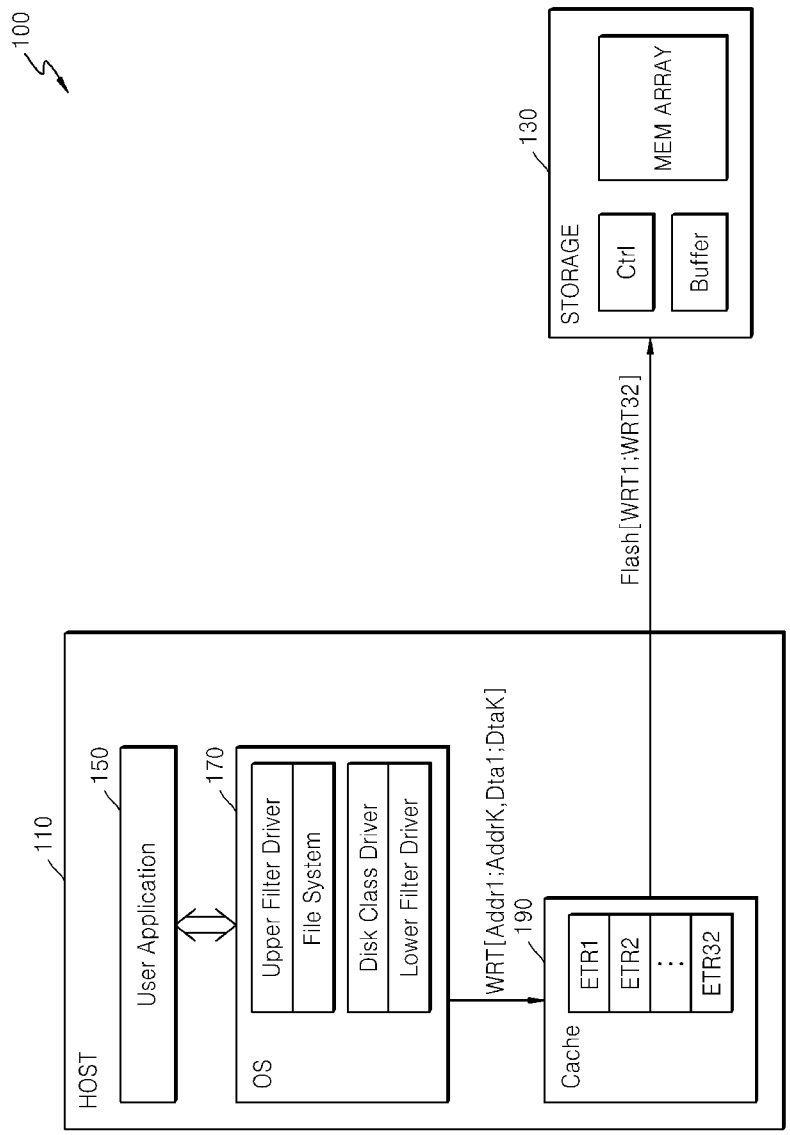
FIG. 2 is a diagram illustrating a computing system according to an embodiment of the inventive concept.

FIG. 2 is a diagram illustrating a computing system 100 according to an embodiment of the inventive concept.

Referring to FIG. 2, the computing system 100 may include a host 110 and a storage 130.

The storage 130 may include a controller Ctrl, a buffer, and a memory array MEM ARRAY. However, the scope of the inventive concept is not limited thereto.

The memory array MEM ARRAY may be constituted by, for example, a DRAM, an SRAM, a PRAM, an MRAM, a ReRAM, an FRAM, a NOR flash memory, a NAND flash memory, or a fusion flash memory (for example, a memory in which an SRAM buffer, a NAND flash memory, and a NOR interface logic are combined).

The controller Ctrl may control an operation of the memory array MEM ARRAY. For example, the controller Ctrl may receive a plurality of writing commands (WRT1: WRT32) and write corresponding data in a region corresponding to an address included in each of commands.

In addition, the controller Ctrl may write data in the memory array MEM ARRAY in response to a writing command, with reference to a logic block address LBA stored in the buffer and a look-up table indicating a correspondence relation of a physical block address PBA.

Figure 3:
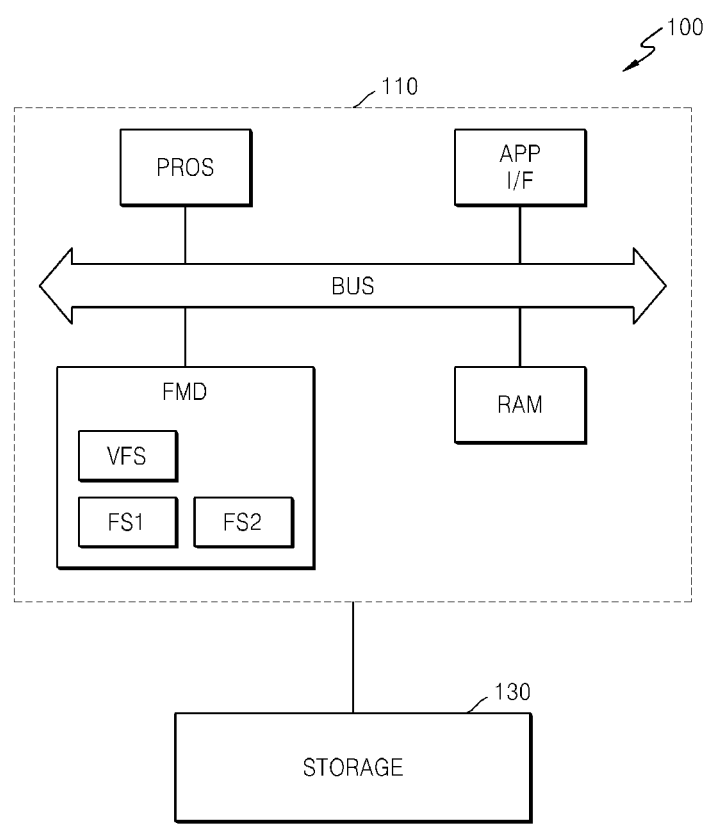
FIG. 3 is a diagram illustrating a computer system CSYS according to an embodiment of the inventive concept.

FIG. 3 is a diagram illustrating the computer system CSYS according to an embodiment of the inventive concept.

Referring to FIG. 3, the computer system 100 according to the current embodiment may include the host 110 and the storage system 130. The host 110 may include an application interface APP I/F, a processor PROS, a random access memory RAM, and a file management device FMD.

The processor PROS may issue an I/O command for inputting and outputting data to and from the storage system 130. In addition, the processor PROS may store data transmitted from the storage system 130 in the random access memory RAM. In addition, the processor PROS may receive the data stored in the random access memory RAM to perform processing, arithmetic operation, and/or handling of the data.

The application interface APP I/F may receive a request of a user or an application to transmit data or a data I/O command to the processor PROS.

The processor PROS may control the file management device FMD to store information stored in a storage system STORAGE in the random access memory RAM, in response to a request of the host. Here, the random access memory RAM may be a dynamic random access memory (DRAM), a static random access memory (SRAM), a different type of volatile memory, or a combination thereof. In other parts of this specification, the random access memory RAM may be referred to as a buffer or a cache.

The file management device FMD may use at least one file system and/or virtual file system. For example, the file management device FMD may use a first file system FS1 and a second file system FS2. A virtual file system VFS allows a client application program to have access to the plurality of file systems FS1 and FS2 by using the same method. The virtual file system VFS may define an interface between a kernel of a computer operating system and the file systems FS1 and FS2.

For example, the file systems FS1 and FS2 of the file management device FMD may be a Unix-based file system, a file system of LINUX, a file system of MacOS, or a file system of Microsoft Windows.

For example, the file systems FS1 and FS2 may be an advanced disc filing system (AdvFS), a be file system (BFS), Btrfs, CrossDOS, a disc filing system (DFS), Episode, EFS, exFAT, ext, FAT, Files-11, hierarchical file system (HFS), HFS plus, a high performance file system, IBM GPFS, JFS, a Macintosh file system, MINIX, a NetWare file system, NILFS, a Nobel storage service, NTFS, QFS, QNX4FS, a ReiserFS (Reiser4), SpadFS, UBIFS, a Unix file system, a veritas file system (VxFS), VFAT, a write anywhere file layout (WAFL), XFS, Xsan, or ZFS.

When the computing system CSYS according to the current embodiment is a mobile device, a battery for supplying an operation voltage of the computing system and a modem such as a baseband chipset may be additionally provided. In addition, the computing system CSYS according to the current embodiment may further include an application chipset, a camera image processor (CIS), a mobile DRAM, and the like.

Referring back to FIG. 2, the host 110 may include the processor PROS and the random access memory RAM of FIG. 3, and a host interface HOST I/F. Hereinafter, an operation of the operating system of the host 110 will be described.

The host 110 may receive data which is input through a user application 150. In addition, the host 110 may output output-data through the user application 150. The data which is input through the user application 150 may be processed through a file system of the operating system and may be stored in the storage 130.

Figure 4:
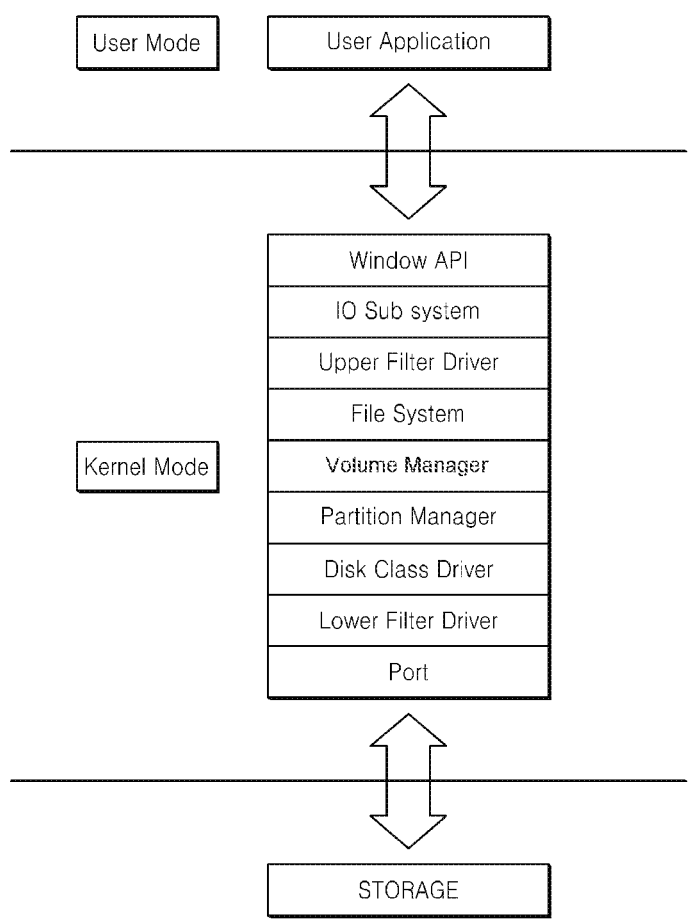
FIG. 4 is a diagram illustrating a process in which data input through a user application is processed through a windows operating system and is then stored in a storage, according to an embodiment of the inventive concept.

FIG. 4 is a diagram illustrating a process in which data input through the user application 150 is processed through a windows operating system and is then stored in the storage 130, according to an embodiment of the inventive concept.

The data which is input through the user application 150 is transmitted to the file system via a window application programming interface and an IO sub system. The file system processes the input data so that the input data includes information regarding where the data is logically stored in the storage 130. That is, the input data is processed to include volume information through a volume manager, partition information through a partition manager, and disc information through a disk class driver. The processed input data is stored in the storage 130 through a port.

The file system may further include an upper filter driver or a lower filter driver. The upper filter driver may process the input data in units of files. The lower filter driver may process the input data in units of logical block addressing (LBA). For example, the host may generate a writing completion signal, may check the size of data stored in the cache to perform reordering, and may check a writing command to perform an operation such as direct bypassing to the storage, through the upper filter driver and the lower filter driver.

Referring to FIG. 2, the host 110 may receive the data which is input through the user application 150. An operating system OS 170 may issue a writing command WRT [Addr1:AddrK, Dta1:DtaK] so as to write the received data in the storage. Pieces of data Dta1 to DtaK may be input to addresses Addr1 to AddrK of the storage, respectively, in response to the writing command WRT[Addr1:AddrK, Dta1:DtaK].

When a queue depth of the writing command issued from the operating system is 1, the host 110 according to the current embodiment may assign entries ETR1 to ETR32 to a cache 190, may store the writing command processed by the operating system in each entry, and then may generate a writing completion signal for the writing command. Accordingly, the host 110 may generate the writing completion signal without receiving the writing completion signal from the storage 130, and may issue the next writing command. Thus, a user may feel that the writing command is rapidly transmitted.

The cache 190 may store the writing command WRT [Addr1:AddrK, Dta1:DtaK] issued from the operating system 170 in the entry ETR1:ETR32. The host 110 may assign a region for storing the writing command to a part of the cache 190 in advance. When a predetermined number of writing commands are filled in the entry ETR1:ETR32, the host 110 may transmit a flush command Flush[WRT1: WRT32] including the writing commands to the storage 130.

A host 110 according to another embodiment of the inventive concept may flush writing commands stored in a cache from the cache to a storage in units of a predetermined number of entries.

For example, the host may transmit a first writing command WRT1 to a 32-nd writing command WRT32 to the storage at a time using a plurality of ports while performing flushing, as in a case where a queue depth is 32. Accordingly, the host may increase transmission efficiency even when the queue depth is 1.

In another embodiment of the inventive concept, when the number of stored writing commands is increased more than a predetermined number, flushing may be performed from a cache to a storage in units of a predetermined number of entries.

Figure 5:
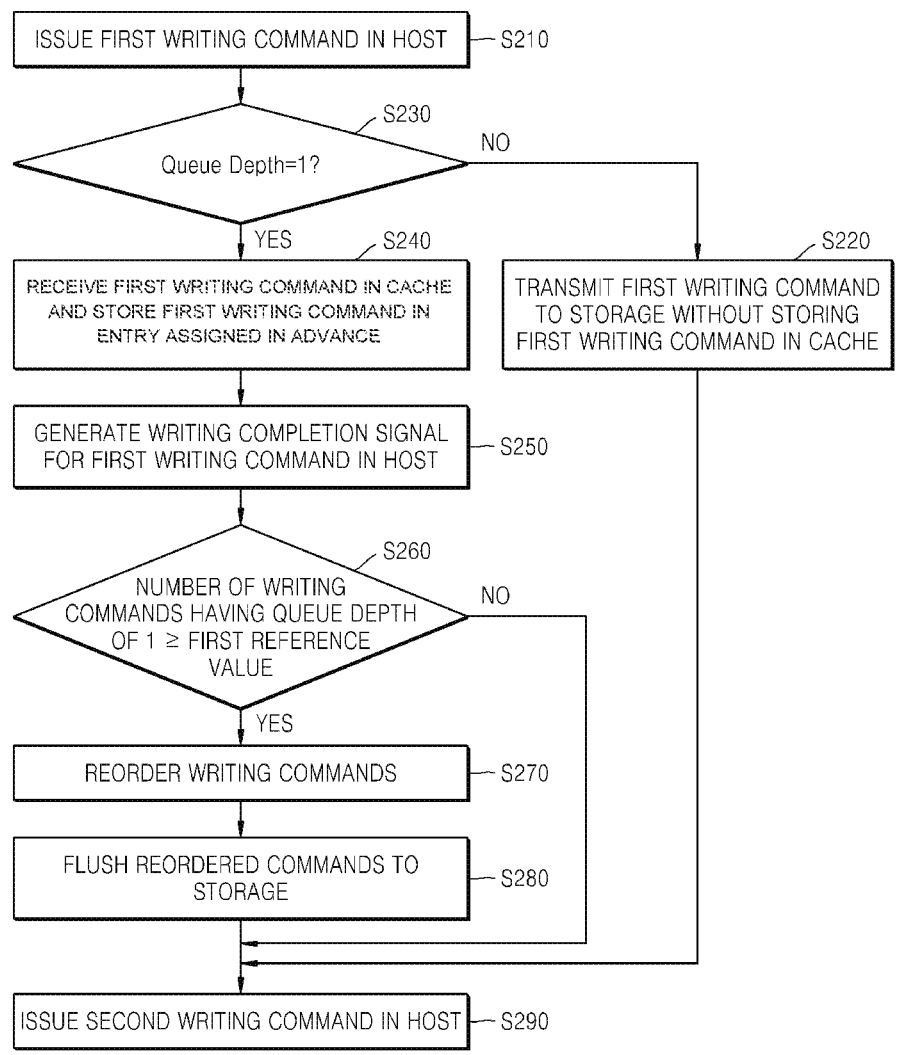
FIG. 5 is a flowchart illustrating a method of writing data of a storage system according to another embodiment of the inventive concept.

FIG. 5 is a flowchart illustrating a method of writing data of a storage system according to another embodiment of the inventive concept.

Referring to FIG. 5, the method of writing data of the storage system may further include reordering writing commands in accordance with address values corresponding to the writing commands (operations S260 and operation S270) when the number of writing commands stored in a cash is equal to or greater than a first reference value, as compared with the method of writing data of the storage system which is described in FIG. 1. Here, the reordering may mean rearrangement performed so that the order of writing commands conform to the order of address values corresponding to the writing commands, which will be described later with reference to FIG. 7.

Figure 6:
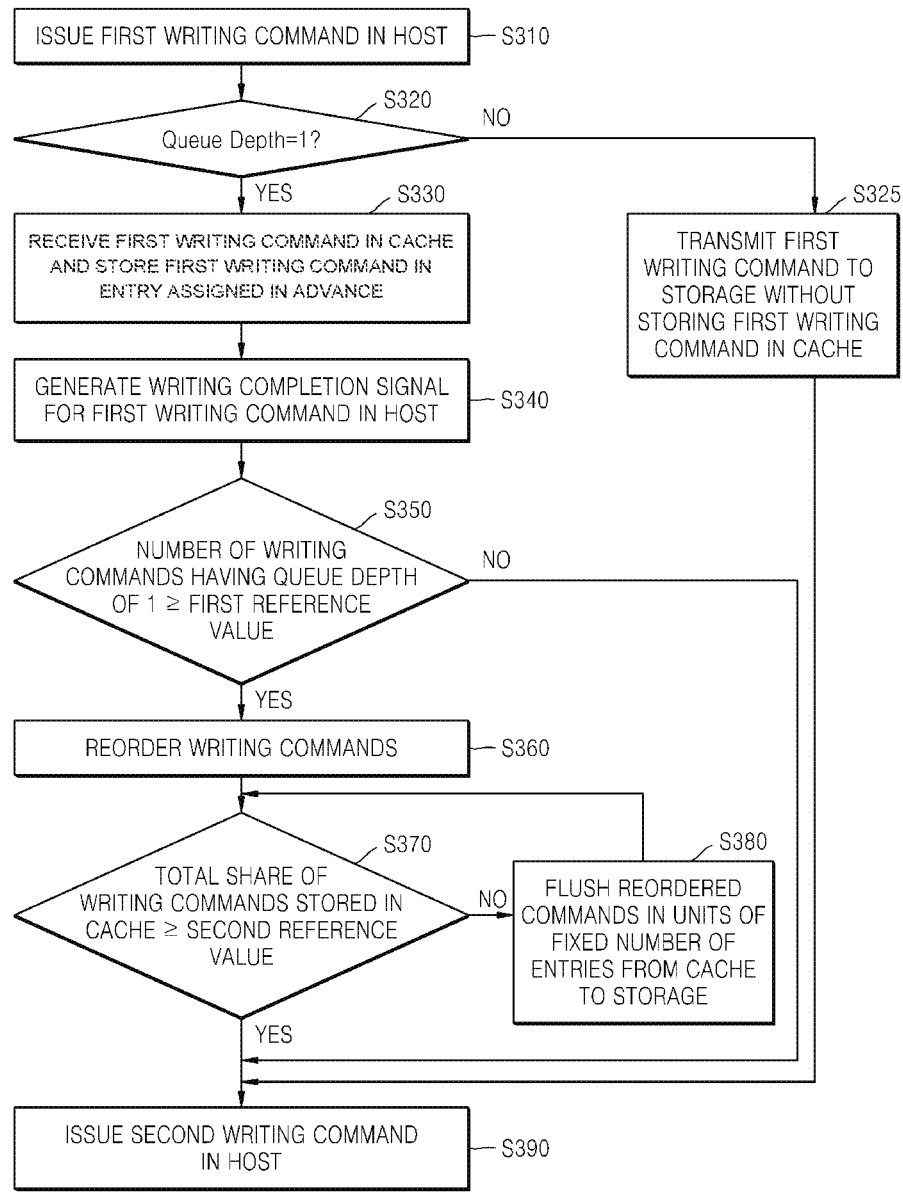
FIG. 6 is a flowchart illustrating a method of writing data of a storage system according to another embodiment of the inventive concept.

FIG. 6 is a flowchart illustrating a method of writing data of a storage system according to another embodiment of the inventive concept.

Referring to FIG. 6, the method of writing data of the storage system according to another embodiment of the inventive concept may further include starting to flush writing commands from a cache to the storage system when the total share of writing commands stored in the cache is increased to a value equal to or greater than a second reference value, as compared with the method of writing data of the storage system which is described with reference to FIG. 5. Here, the flushing may be performed in units of a predetermined number of entries.

In addition, the method of writing data of the storage system according to another embodiment of the inventive concept may further include stopping flushing when the total share of writing commands stored in the cache is decreased to a value equal to or less than a third reference value. Here, the flushing may be performed in units of a predetermined number of entries, which will be described in detail later with reference to FIG. 7.

Figure 7:
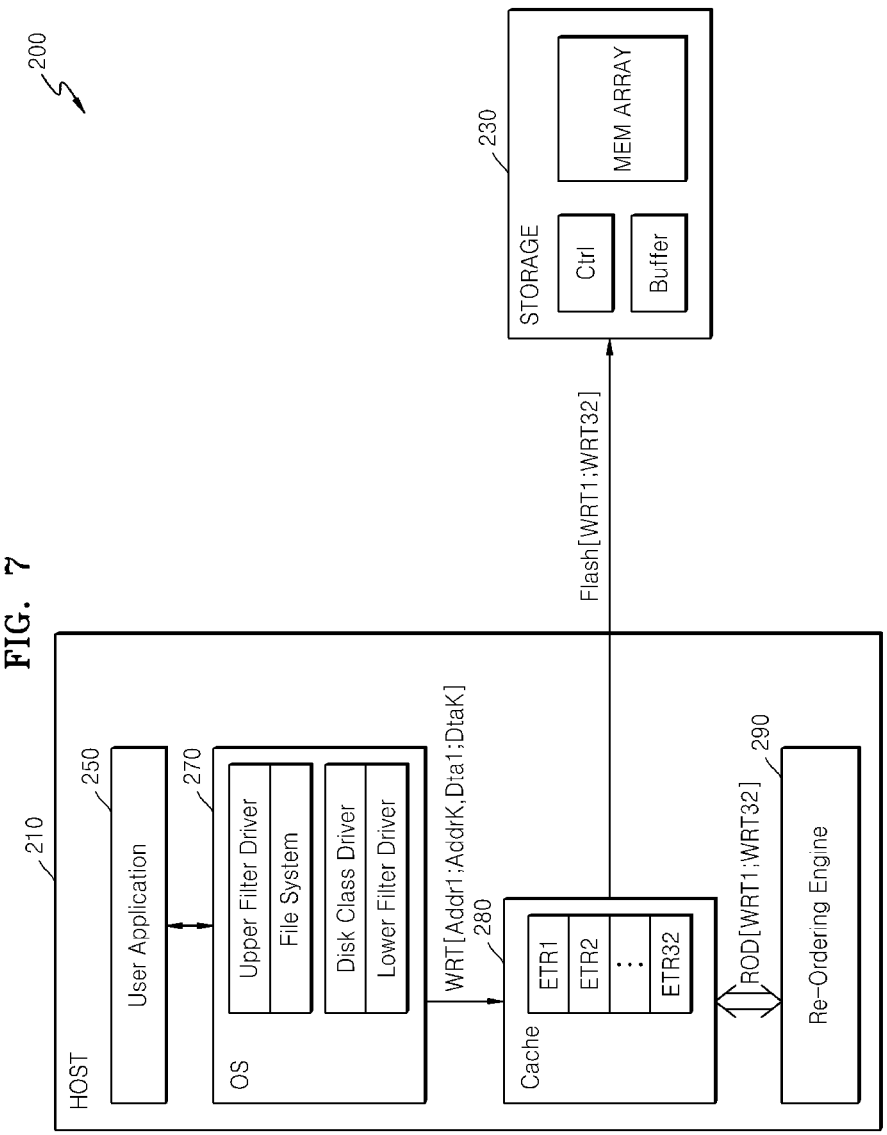
FIG. 7 is a diagram illustrating a computing system according to another embodiment of the inventive concept.

FIG. 7 is a diagram illustrating a computing system 200 according to another embodiment of the inventive concept.

Referring to FIG. 7, the computing system 200 may include a host 210 and a storage 230. The storage 230 may be configured in a similar manner to the storage 130 of FIG. 2.

The host 210 may receive data which is input through a user application 250. An operating system OS 270 may issue a writing command WRT[Addr1:AddrK, Dta1:DtaK] so as to write the received data in the storage 230. Pieces of data Dta1 to DtaK may be input to addresses Addr1 to AddrK of the storage 230, respectively, in response to the writing command WRT[Addr1:AddrK, Dta1:DtaK].

A cache 280 may store the writing command WRT[Addr1:AddrK, Dta1:DtaK] which is issued from the operating system 270 in an entry ETR1:ETR32. When a predetermined number of writing commands are filled in the entry ETR1:ETR32, the host 210 may transmit a flush command Flush[WRT1:WRT32] including the writing commands to the storage 230.

The host 210 according to the current embodiment may further include a reordering engine 290. When the number of writing commands stored in a cache 280 is equal to or greater than a first reference value, the reordering engine 290 may perform reordering of the writing commands in response to address values corresponding to the writing commands.

For example, it is assumed that the number of writing commands, having a queue depth of 1, stored in the cache 280 is 32 and that each of the writing commands is stored in the entry ETR1:ETR32. The reordering engine 290 may perform reordering ROD[WRT1:WRT32] of the writing commands (for example, WRT1 to WRT32) in accordance with the order of addresses of the storage 230.

The writing commands on which the reordering is performed may be stored in the cache 280 again and then may be flushed (Flush[WRT1:WRT32]) to the storage 230. Although not shown in FIG. 7, the writing commands on which the reordering is performed may be flushed (Flush[WRT1:WRT32]) to the storage 230 without being stored in the cache 280 again. Accordingly, the writing commands on which the reordering is performed have a sequential characteristic, and thus pieces of input data may be rapidly written in the storage 230.

When the total share of writing commands stored in the cache is increased to a value equal to or greater than a second reference value, the host 210 according to the current embodiment may start to flush the writing commands from the cache to a storage system.

In addition, in the method of writing data of the storage system, when the total share of writing commands stored in the cache is decreased to a value equal to or less than a third reference value, the host 210 may stop the flushing.

For example, it is assumed that the total size of writing commands is 60 MB when the capacity of the cache 280 is 1 GB. In this case, the total share of the writing commands is 6%. If the second reference value is 5%, the writing commands may be continuously flushed by, for example, 128 KB. In this case, the flushing may be continuously performed by 2 MB, and the total size of the writing commands occupied in the cache 280 may be decreased to equal to or less than 50 MB. If the total size of the writing commands occupied in the cache 280 is decreased to equal to or less than 50 MB, the host 210 may stop the flushing.

Accordingly, the computing system 200 according to the current embodiment may perform reordering of writing commands having a constant size so that the writing commands may have a sequential characteristic, thereby allowing pieces of input data to be rapidly written in the storage 230.

Figure 8:
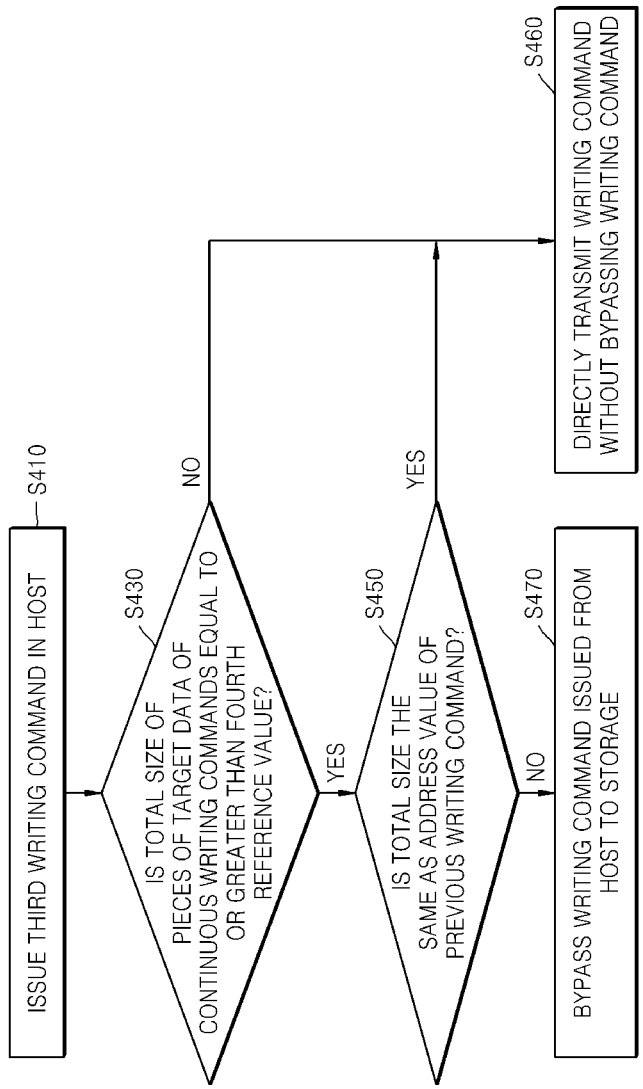
FIG. 8 is a flowchart illustrating a method of writing data of a storage system according to another embodiment of the inventive concept.

FIG. 8 is a flowchart illustrating a method of writing data of a storage system according to another embodiment of the inventive concept.

Figure 9:
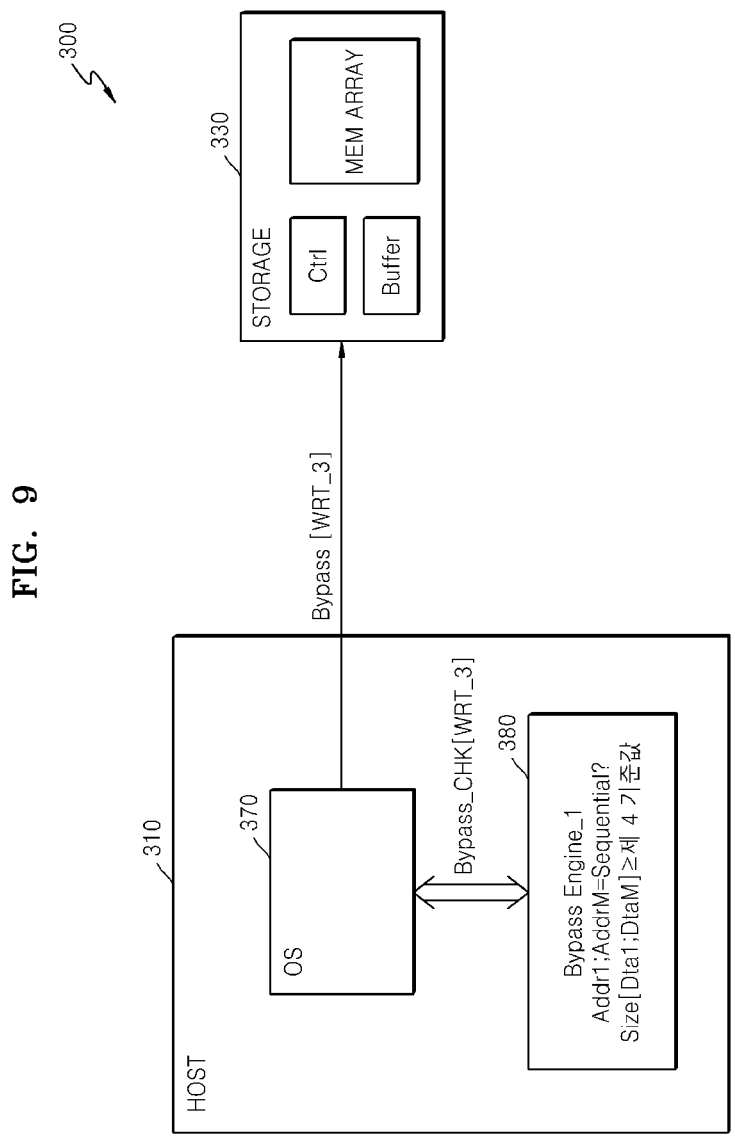
FIG. 9 is a diagram illustrating a computing system according to another embodiment of the inventive concept.
Figure 10:
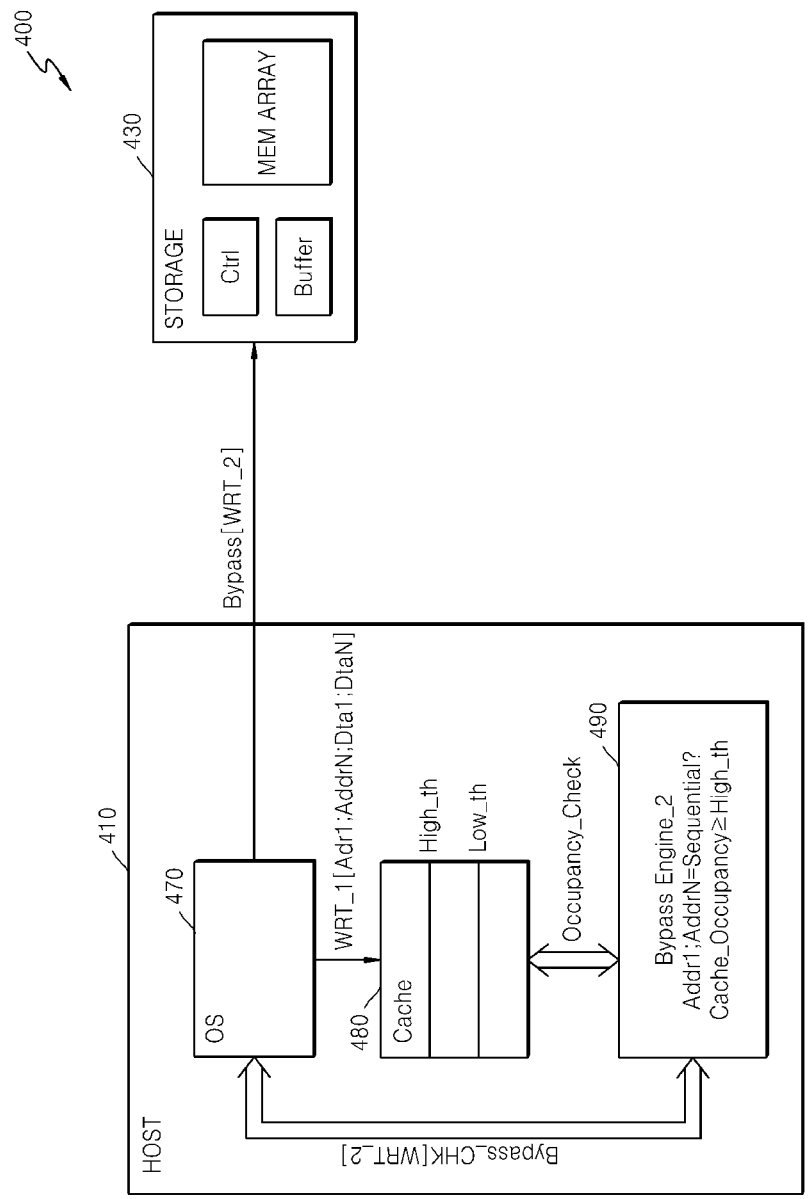
FIG. 10 is a diagram illustrating a computing system according to another embodiment of the inventive concept.

Referring to FIG. 8, the method of writing data of the storage system according to another embodiment of the inventive concept may include causing a host to issue a third writing command (operation S410), and bypassing the third writing command issued by the host without storing the third writing command in a cache when the total size of continuous writing commands is equal to or greater than a fourth reference value and is not the same as an address value of the previous writing command (operation S430, operation S450, and operation S470), which will be described later in detail with reference to FIGS. 9 and 10.

FIG. 9 is a diagram illustrating a computing system 300 according to another embodiment of the inventive concept.

Referring to FIG. 9, the computing system 300 may include a host 310 and a storage 330. The storage 330 may be configured in a similar manner to the storage 130 of FIG. 2.

The host 310 according to the current embodiment may include a first bypass engine Bypass Engine_1 380. The first bypass engine 380 checks whether a writing command WRT_3[Addr1:AddrM, Dta1:DtaM] issued from an operating system 370 may be bypassed. That is, the first bypass engine 380 checks whether the total size of pieces of target data of a third writing command is equal to or greater than a fourth reference value and whether target address values of the third writing command are sequential values.

Specifically, the operating system 370 transmits a bypass check command Bypass_CHK[WRT_3] with respect to the issued third writing command to the first bypass engine 380. The first bypass engine 380 may determine whether the target address values Addr1:AddrM of the third writing command are sequential values and whether the total size of pieces of target data Dta1 to DtaM of the third writing command is equal to or greater than the fourth reference value.

When the target address values Addr1:AddrM of the third writing command are sequential values and the total size of the pieces of target data Dta1 to DtaM of the third writing command is, for example, equal to or greater than 4 MB, the operating system 370 may directly bypass (Bypass [WRT_3]) the writing command to the storage 330. Accordingly, when the pieces of target data of the writing command targeted at the sequential address values have a size equal to or greater than a constant size, the writing command may be directly transmitted to the storage without being stored in a cache, and thus a writing speed may be increased.

FIG. 10 is a diagram illustrating a computing system 400 according to an embodiment of the inventive concept.

Referring to FIG. 10, the computing system 400 may include a host 410 and a storage 430. The storage 430 may be configured in a similar manner to the storage 130 of FIG. 2.

The host 410 according to the current embodiment may include a second bypass engine Bypass Engine_2 490. A writing command WRT_1[Addr1:AddrN, Dta1:DtaN] which is issued from an operating system 470 is stored in a cache. When the total share of writing commands stored in the cache is equal to or greater than a fifth reference value and target address values of a second writing command generated thereafter are sequential values, the second bypass engine 490 may flush the second writing command to the storage 430.

Specifically, when the writing command WRT_1[Addr1:AddrN, Dta1:DtaN] is stored in the cache and the total share of writing commands stored in the cache is equal to or greater than the fifth reference value, the second bypass engine 490 may determine whether the target addresses of the second writing command generated thereafter are sequential addresses. When the target addresses of the second writing command generated thereafter are sequential addresses, the operating system 470 may generate a bypass command Bypass [WRT_2] for directly transmitting the second writing command WRT_2 to the storage 430.

Accordingly, when writing commands targeted at sequential address values are issued and the total share of writing commands stored in the cache 480 is equal to or greater than the fifth reference value, the writing commands may be directly transmitted to the storage 430 without being stored in the cache 480, and thus a writing speed may be increased.

Figure 11:
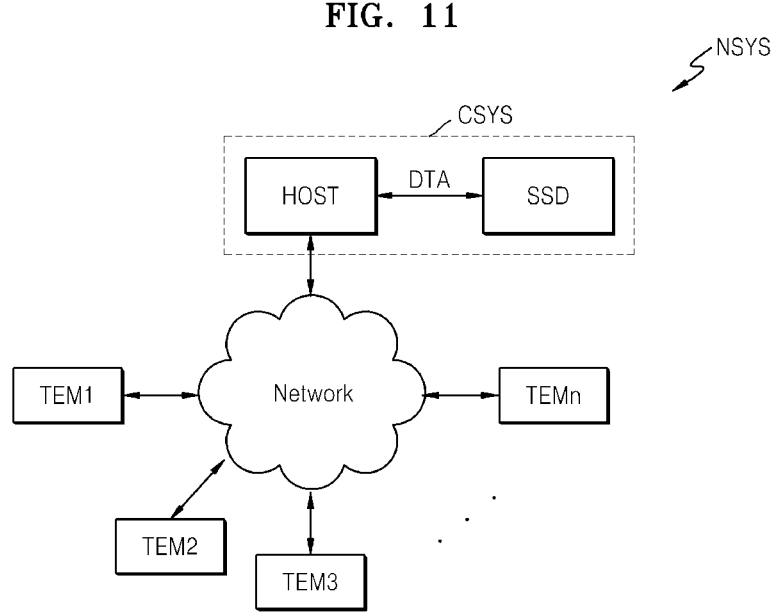
FIG. 11 is a diagram illustrating a computing system including an SSD, and a network system.

FIG. 11 is a diagram illustrating a computing system including an SSD, and a network system NSYS.

Referring to FIG. 11, the network system NSYS according to the current embodiment may include a computing system CSYS and a plurality of terminals TEM1 to TEMn connected to each other through a network. The computing system CSYS according to the current embodiment may include a server that processes a request received from the plurality of terminals TEM1 to TEMn, and an SSD that stores data corresponding to the request received from the terminals TEM1 to TEMn.

A host of FIG. 11 may be the host 110 of FIG. 2. In addition, the computing system CSYS of FIG. 11 may be the computing system CSYS of FIG. 3. Furthermore, even when the host of FIG. 11 issues a writing command of data to the plurality of terminals TEM1 to TEMn included in the network, the method of FIG. 1 may be applied.

While the inventive concept has been particularly shown and described with reference to exemplary embodiments thereof, it will be understood that various changes in form and details may be made therein without departing from the spirit and scope of the following claims.

What is claimed is:

1. A method of writing data of a storage system by host, the method comprising:
issuing by the host a first writing command to write data to a storage;
determining by the host a queue depth of the first writing command;
storing the first writing command in an entry which is assigned in advance and is comprised in a cache of the host when a queue depth of the first writing command is a first value;
generating by the host a writing completion signal in response to the first writing command; and
issuing by the host a second writing command.

2. The method of claim 1, further comprising, when a number of writing commands stored in the cache is equal to or greater than a first reference value, reordering the writing commands in accordance with address values corresponding to the writing commands.

3. The method of claim 2, wherein the reordering of the writing commands comprises rearranging the writing commands so that an order of the writing commands conforms to an order of the address values corresponding to the writing commands.

4. The method of claim 2, further comprising, when a total share of the writing commands stored in the cache is equal to or greater than a second reference value, starting to flush the writing commands from the cache to the storage system.

5. The method of claim 4, further comprising, when the total share of the writing commands stored in the cache is equal to or less than a third reference value, stopping the flushing.

6. The method of claim 4, wherein the flushing is performed in units of a fixed number of entries.

7. The method of claim 1, further comprising, when a total size of pieces of target data of the second writing command is equal to or greater than a third reference value and target address values of the second writing command are sequential values, flushing the second writing command from the host to the storage without transmitting the second writing command from the host to the cache.

8. The method of claim 1, further comprising, when the first writing command is stored in the cache, a total share of writing commands stored in the cache is equal to or greater than a fourth reference value, and target address values of the second writing command are sequential values, flushing the second writing command from the host to the storage.

9. The method of claim 7, wherein when a target address of the second writing command conforms to a target address of a writing command which is stored in the cache in advance, the writing command stored in the cache in advance is not flushed to the storage, and only the second writing command is flushed to the storage.

10. A computing system, comprising:
a host; and
a storage system,
wherein the host determines the queue depth of the first writing command and when a queue depth of a first writing command is 1, the host stores the first writing command in an entry which is assigned in advance and is comprised in a cache located at the host, the host generates a writing completion signal for the first writing command, and the host issues a second writing command.

11. The computing system of claim 10, wherein when a number of writing commands stored in the cache is equal to or greater than a first reference value, the writing commands are reordered in accordance with address values corresponding to the writing commands.

12. The computing system of claim 11, wherein the writing commands are rearranged so that an order of the writing commands conforms to an order of the address values corresponding to the writing commands.

13. The computing system of claim 11, wherein when a total share of the writing commands stored in the cache is equal to or greater than a second reference value, the writing commands started to be flushed from the cache to the storage system.

14. The computing system of claim 10, wherein when a total size of pieces of target data of the second writing command is equal to or greater than a third reference value and target address values of the second writing command are sequential values, the second writing command is flushed from the host to the storage without being transmitted from the host to the cache.

15. The computing system of claim 10, wherein when the first writing command is stored in the cache, a total share of writing commands stored in the cache is equal to or greater than a fifth reference value, and target address values of the second writing command are sequential values, the second writing command is flushed from the host to the storage.

16. The method of claim 1, wherein the storage is separate from the cache of the host.

17. The computing system of claim 10, wherein the storage is separate from the cache of the host.

18. The computing system of claim 10, wherein the queue depth of the first writing command comprises a physical limitation of a storage port capable of performing inputting and outputting at a time, and
wherein when the queue depth of the first writing command is not 1, the host sends the first writing command to storage without storing the first writing command in the entry in the cache located at the host.

19. The method of claim 1, wherein the queue depth of the first writing command comprises a physical limitation of a storage port capable of performing inputting and outputting at a time.

20. The method of claim 19, wherein the method further comprises when the queue depth of the first writing command is not 1, the host sends the first writing command to storage without storing the first writing command in the entry in the cache located at the host.

* * * * *